Patented Nov. 27, 1951

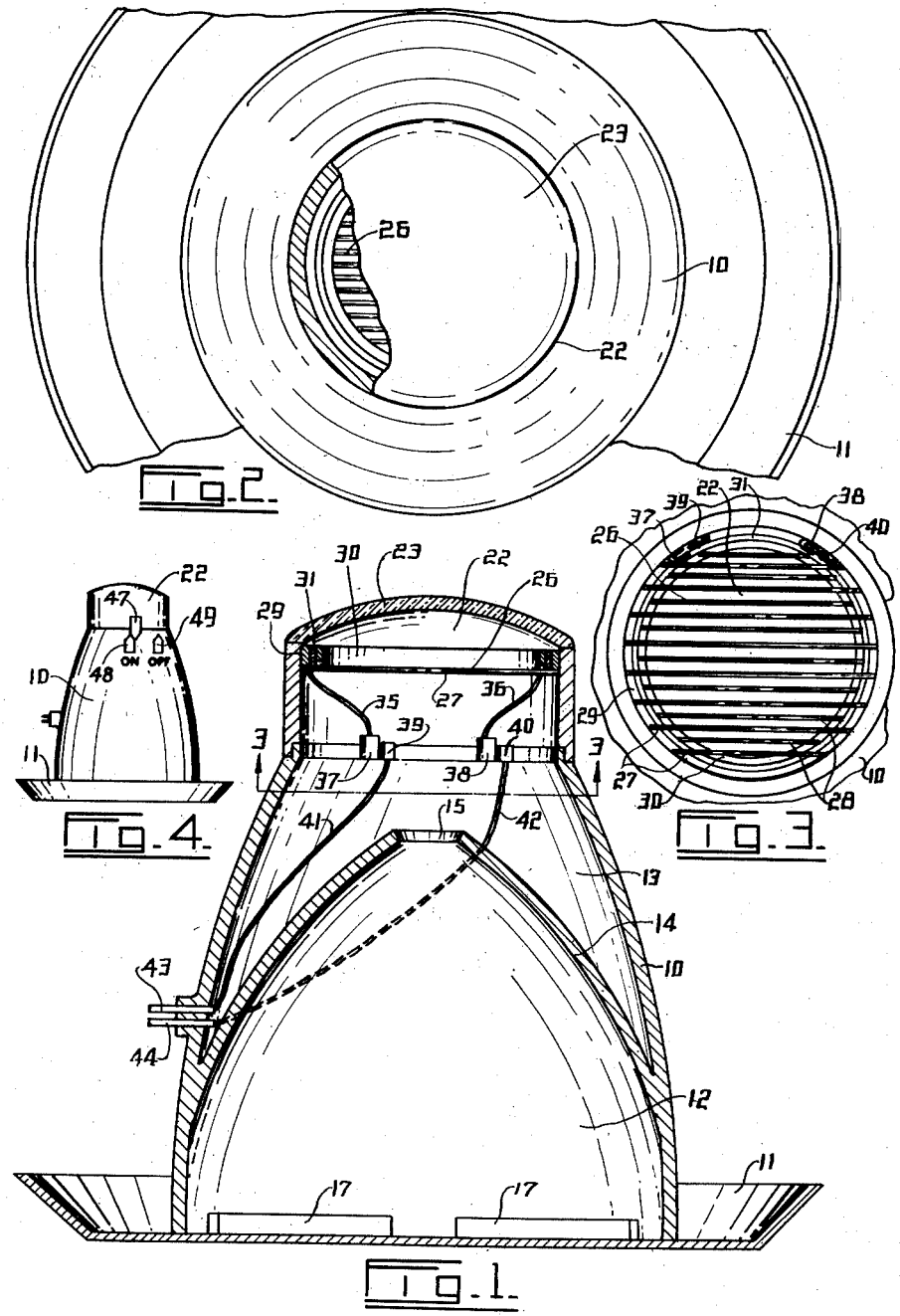

2,576,118

UNITED STATES PATENT OFFICE 2,576,118

INSECT DESTROYER

Alf Torbjorn Holte, New Westminster,
British Columbia, Canada

Application February 25, 1947, Serial No. 730,693

2 Claims. (Cl. 43—112)

This invention relates to improvements in insect destroyers.

An object of the present invention is the provision of a device which will lure insects, such as flies, into it to be destroyed.

Another object is the provision of an insect destroyer in which the insect is trapped and cannot escape.

A further object is the provision of an insect destroyer which is simple in construction, and neat and compact in appearance.

Yet another object is the provision of a device of the nature described in which insects are destroyed electrically, and including a novel and simple method of controlling the electric current.

With the above and other objects in view, the present invention consists essentially of an insect destroyer comprising a housing, an entrance adjacent the bottom of the housing, a transparent area at the top of the housing, a grid between the transparent area and the entrance, said grid including a plurality of alternating positive and negative conductors arranged side by side, and means for connecting the positive conductors and the negative conductors to a source of electrical supply, as more fully described in the following specification and illustrated in the accompanying drawings, in which Fig. 1 is a side elevation, partly in section, of the insect destroyer, Fig. 2 is a fragmentary plan view of the device, Fig. 3 is a horizontal section taken on the line 3—3 of Fig. 1, and Fig. 4 is a reduced side elevation of the complete device.

Referring more particularly to the drawings, 10 is a dome shaped housing open at both ends and removably positioned in a dish 11. This housing is divided into outer and inner chambers 12 and 13 respectively by a dome shaped wall 14 which has a relatively small opening 15 at the apex thereof, said opening forming an entrance into the inner chamber. One or more openings 17 formed at the bottom of the housing form an entrance into the outer chamber.

A cylindrical cover 22 is removably mounted on top of the housing 10 and has a transparent area 23 in the top thereof. A grid 26 is mounted in the cover between the entrance 15 and the transparent area, said grid underlying the latter. This grid is formed with a plurality of alternating positive and negative conductors 27 and 28, arranged side by side and spaced from each other. The grid may be constructed in any desired manner. In the example illustrated in the drawings, the conductors 27 and 28 are connected to conducting rings 29 and 30, respectively, which are separated by an insulating ring 31. If the positive and negative conductors are in the same plane, recesses may be formed in the lower edge of the ring 30 so that the conductors 27 pass therethrough without touching said ring.

Electrical current is supplied to the conductors in any suitable manner. It is preferred, however, to provide a connection so that the cover 22 may be removed from the housing, and so that said cover may be turned to make and break the circuit including the conductors. To this end, rings 29 and 30 are connected by wires 35 and 36 to female contacts 37 and 38 mounted in the cover and projecting downwardly into the housing. Corresponding male contacts 39 and 40 are mounted in the housing adjacent the contacts 37 and 38, said former contacts being connected by wires 41 and 42 to prongs 43 and 44, by means of which the device may be removably connected to a suitable source of electrical power, not shown.

When the device is plugged in to the electrical power supply, the cover 22 may be turned to bring the contacts 37 and 38 into engagement with the contacts 39 and 40, thus supplying current to the conductors 27 and 28. If desired, a pointer 47 mounted on the cover, see Fig. 4, may engage "on" and "off" lugs 48 and 49 mounted on the housing to limit the turning movement of the cover and to indicate whether the current to the conductors is on or off.

In use, the device is turned on and suitable bait placed on the dish 11 beneath the housing 10. Insects, such as flies, enter the chamber 12 through the openings 17. It is very seldom that these flies will crawl back out through said openings. They seem to have the tendency to fly or crawl up towards a light. Thus, they pass through the opening 15 into the inner chamber when attempting to reach the light entering through the transparent area 23. When a fly hits the grid 26, it is bound to touch at least one pair of conductors 27 and 28, thus closing the circuit and it is, consequently, electrocuted. The insect usually falls clear of the grid into the bottom of the inner chamber which is formed by the wall 14 and the wall of the housing 10. The device may be cleaned out from time to time by removing the cover.

I claim:

1. An insect destroyer comprising a housing said housing being open at the top thereof, an entrance adjacent the bottom of the housing, a cover removably mounted on the housing over its top opening, a transparent area in the top of the cover, a grid in the cover underlying the transparent area between the latter and the housing entrance, said grid including a plurality of alternating positive and negative conductors arranged side by side, two separate contacts in the cover, means connecting the positive conductors to one cover contact, means connecting the negative conductors to the other cover contact, a contact in the housing adjacent each contact in the cover, and means for connecting the housing contacts to a source of electrical supply, said cover being adapted to be moved to bring its contacts into and out of engagement with the housing contacts.

2. An insect destroyer comprising a housing said housing being open at the top thereof, outer and inner chambers formed in the housing, an entrance into the outer chamber adjacent the bottom of the housing, a cover removably mounted on the housing over its top opening, a transparent area in the top of the cover, a relatively small opening between the outer and inner chambers, a grid in the cover underlying the transparent area between the latter and the small opening, said grid including a plurality of alternative positive and negative conductors arranged side by side, two separate contacts in the cover, means connecting the positive conductors to one cover contact, means connecting the negative conductors to the other cover contact, a contact in the housing adjacent each contact in the cover, and means for connecting the housing contacts to a source of electrical supply, said cover being adapted to be moved to bring its contacts into and out of engagement with the housing contacts.

ALF TORBJORN HOLTE.

REFERENCES CITED

The following references are of record in the file of this patent:

UNITED STATES PATENTS

| Number | Name | Date |
|---|---|---|
| 722,143 | Raymond | Mar. 3, 1903 |
| 1,085,388 | Overmyer | Jan. 27, 1914 |
| 1,163,823 | Irvine | Dec. 14, 1915 |
| 1,295,207 | Reed | Feb. 25, 1919 |

FOREIGN PATENTS

| Number | Country | Date |
|---|---|---|
| 292,779 | Great Britain | June 28, 1928 |